United States Patent
Thor (10) Patent No.: US 8,688,336 B2
(45) Date of Patent: Apr. 1, 2014

(54) SYSTEM AND METHOD FOR CONTROLLING POWER DOWNSHIFTS OF A TRANSMISSION

(75) Inventor: Todd J. Thor, Byron, MI (US)

(73) Assignee: GM Global Technology Operations LLC

( * ) Notice: Subject to any disclaimer, the term of this patent is extended or adjusted under 35 U.S.C. 154(b) by 792 days.

(21) Appl. No.: 12/878,370

(22) Filed: Sep. 9, 2010

(65) Prior Publication Data

US 2012/0065849 A1    Mar. 15, 2012

(51) Int. Cl.
 *F16H 61/00* (2006.01)

(52) U.S. Cl.
 USPC ........... 701/53; 701/51; 701/55; 701/57; 701/58; 701/60; 475/116; 475/120; 475/121; 475/123; 477/102; 477/105; 477/115; 477/141

(58) Field of Classification Search
 USPC ........... 701/51, 53, 55, 57, 58, 60; 475/116, 475/120, 121, 123, 42, 65; 477/102, 105, 477/115, 141, 144, 148, 149, 154, 155, 174, 477/181
 See application file for complete search history.

(56) References Cited

U.S. PATENT DOCUMENTS

| | | | |
|---|---|---|---|
| 5,211,079 A * | 5/1993 | Runde et al. | 477/61 |
| 5,343,782 A * | 9/1994 | Jamzadeh | 477/156 |
| 7,381,151 B2 * | 6/2008 | Shim | 477/154 |
| 7,421,326 B2 * | 9/2008 | Thor et al. | 701/67 |
| 7,559,873 B2 * | 7/2009 | Thor et al. | 477/79 |
| 7,591,756 B2 * | 9/2009 | Thor | 477/70 |
| 7,693,635 B2 * | 4/2010 | Rains | 701/51 |
| 8,108,112 B2 * | 1/2012 | Thor | 701/54 |
| 8,180,538 B2 * | 5/2012 | Feldpausch et al. | 701/57 |
| 8,255,130 B2 * | 8/2012 | Fujii et al. | 701/55 |
| 8,328,688 B2 * | 12/2012 | Fujii et al. | 477/155 |
| 2006/0036359 A1 * | 2/2006 | Thor et al. | 701/67 |
| 2006/0089775 A1 * | 4/2006 | Whitton et al. | 701/51 |
| 2008/0081735 A1 * | 4/2008 | Runde | 477/107 |
| 2010/0131161 A1 * | 5/2010 | Feldpausch et al. | 701/55 |
| 2010/0262344 A1 * | 10/2010 | Fujii et al. | 701/55 |
| 2010/0318269 A1 * | 12/2010 | Yanakiev et al. | 701/55 |
| 2012/0065849 A1 * | 3/2012 | Thor | 701/53 |

* cited by examiner

*Primary Examiner* — Thomas Black
*Assistant Examiner* — Wae Louie (57) ABSTRACT

A system for controlling power downshifts of a transmission includes a flare generation module, a flare control module, and a shift control module. The flare generation module generates turbine speed flare by decreasing pressure applied to an off-going clutch of the transmission. The flare control module decreases the turbine speed flare by increasing the pressure applied to the off-going clutch of the transmission. The shift control module increases a pressure applied to an on-coming clutch of the transmission when the turbine speed flare is less than a predetermined amount from a desired turbine speed flare.

20 Claims, 6 Drawing Sheets

SYSTEM AND METHOD FOR CONTROLLING POWER DOWNSHIFTS OF A TRANSMISSION

FIELD

The present disclosure relates to transmission control systems and more particularly to a system and method for controlling power downshifts of a transmission.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air/fuel (NF) mixture within cylinders to drive pistons that rotatably turn a crankshaft and generate drive torque. The drive torque may be transferred from the crankshaft to a driveline (e.g., wheels) of a vehicle via a transmission. The transmission may be coupled to the crankshaft by a fluid coupling such as a torque converter. The transmission may include a plurality of gear ratios that multiply the drive torque at the crankshaft to increase drive torque at the driveline.

The transmission may transition between the gear ratios by either shifting to a higher gear ratio ("upshifting") or shifting to a lower gear ratio ("downshifting"). Shifting may further be defined as "power-on" (when an accelerator pedal is depressed) or "power-off" (when an accelerator pedal is not depressed). Alternatively, power-on shifting may be referred to as "power" shifting. Power shifting may require more precise control due to driver input during the shift operation (e.g. via an accelerator pedal).

SUMMARY

A system for controlling power downshifts of a transmission includes a flare generation module, a flare control module, and a shift control module. The flare generation module generates turbine speed flare by decreasing pressure applied to an off-going clutch of the transmission. The flare control module decreases the turbine speed flare by increasing the pressure applied to the off-going clutch of the transmission. The shift control module increases a pressure applied to an on-coming clutch of the transmission when the turbine speed flare is less than a predetermined amount from a desired turbine speed flare.

A method for controlling power downshifts of a transmission includes generating turbine speed flare by decreasing pressure applied to an off-going clutch of the transmission, decreasing the turbine speed flare by increasing the pressure applied to the off-going clutch of the transmission, and increasing a pressure applied to an on-coming clutch of the transmission when the turbine speed flare is less than a predetermined amount from a desired turbine speed flare.

In still other features, the systems and methods described above are implemented by a computer program executed by one or more processors. The computer program can reside on a tangible computer readable medium such as but not limited to memory, nonvolatile data storage, and/or other suitable tangible storage mediums.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Internal combustion engines combust an air/fuel (NF) mixture within cylinders to drive pistons that rotatably turn a crankshaft and generate drive torque. The torque generated at the crankshaft may also be referred to as "engine torque" (or "input torque"). A transmission transfers the engine torque to a driveline (e.g., wheels) of a vehicle. The torque at an output shaft of the transmission may be referred to as "output torque." Output torque may rapidly increase during power downshifts causing noise, vibration, and/or harshness (NVH) for a driver of the vehicle. Conventional transmission control systems, therefore, may either maintain constant engine torque or decrease engine torque during power downshifts.

Maintaining constant engine torque or decreasing engine torque during power downshifts, however, decreases the output torque. Moreover, engine torque may be further decreased during power downshifts to allow an on-coming clutch to engage, which further decreases the output torque. Conventional transmission control systems, therefore, subsequently increase engine torque to increase output torque at the end of a power downshift. Rapidly increasing (e.g., ramping) engine torque at the end of the power downshift, however, may rapidly increase acceleration causing increased NVH for the driver.

Figure 1:
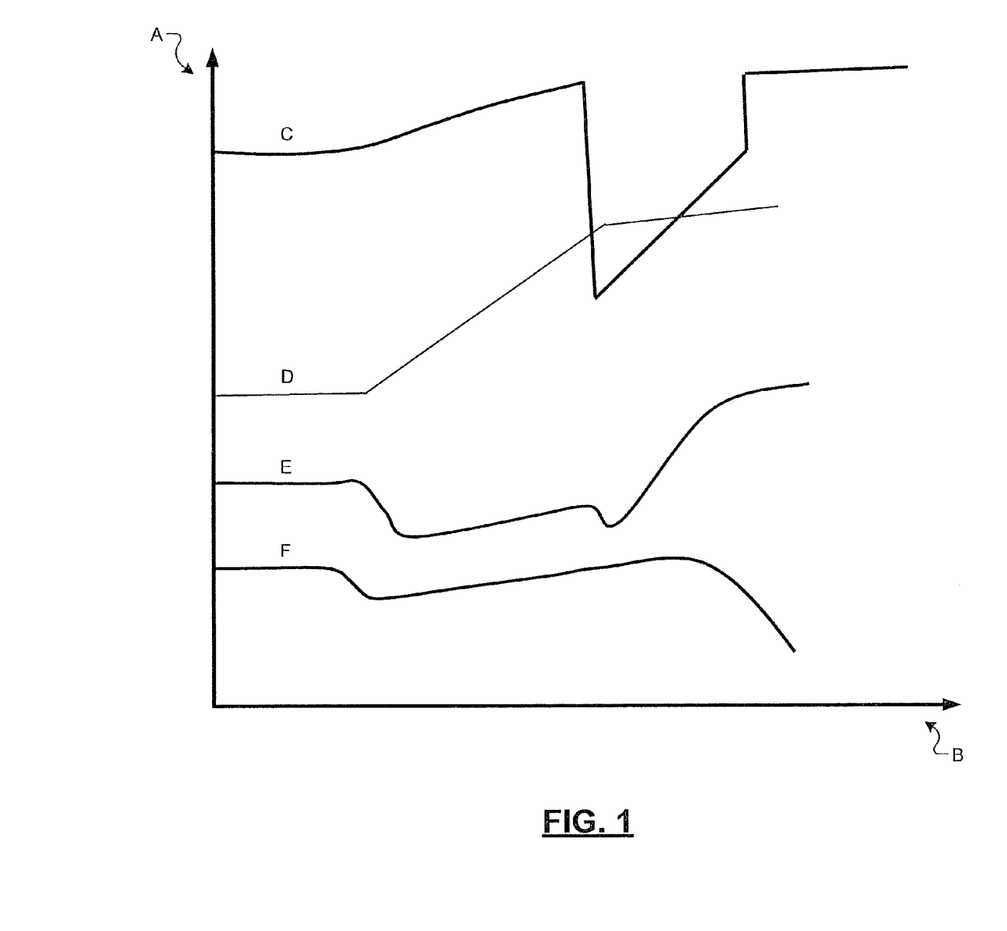
FIG. 1 is a graph illustrating engine torque, turbine speed, output acceleration, and on-coming clutch torque during a power downshift operation.

Referring now to FIG. 1, engine torque, turbine speed, output acceleration, and on-coming clutch torque are shown during a power downshift operation. For example, the on-coming clutch torque may refer to a pressure applied to the on-coming clutch (e.g., hydraulic fluid pressure). A vertical axis ("A") indicates torque or rotational speed (depending on each curve) and a horizontal axis ("B") indicates time. Additionally, curve "C" represents engine torque, curve "D" represents turbine seed, curve "E" represents output acceleration, and curve "F" represents on-coming clutch torque. As shown, engine torque is decreased during the power downshift which causes a rapid increase in both turbine speed and the output acceleration (and thus increased NVH).

Accordingly, a system and method are presented for improved control of power downshifts of a transmission. The system and method may increase acceleration throughout a power downshift of the transmission by controlling off-going clutch torque. For example, the off-going clutch torque may be controlled progressively (e.g., in stages) throughout the power downshift. Rather, the system and method generates "turbine speed flare" by decreasing the off-going clutch torque. "Turbine speed flare" refers to a difference between turbine speed and a desired (i.e., final) turbine speed.

The system and method may then control the turbine speed flare. Specifically, the system and method may decrease the turbine speed flare towards a desired turbine speed flare by increasing the off-going clutch torque. When the turbine speed flare is within a predetermined amount from the desired turbine speed flare, on-coming clutch torque may be increased (i.e., ramped) to a desired torque. Thus, the output torque increases at a constant rate and tie-up between the on-coming and off-going clutches is prevented, thereby providing a smoother power downshift and decreasing NVH.

Figure 2A:
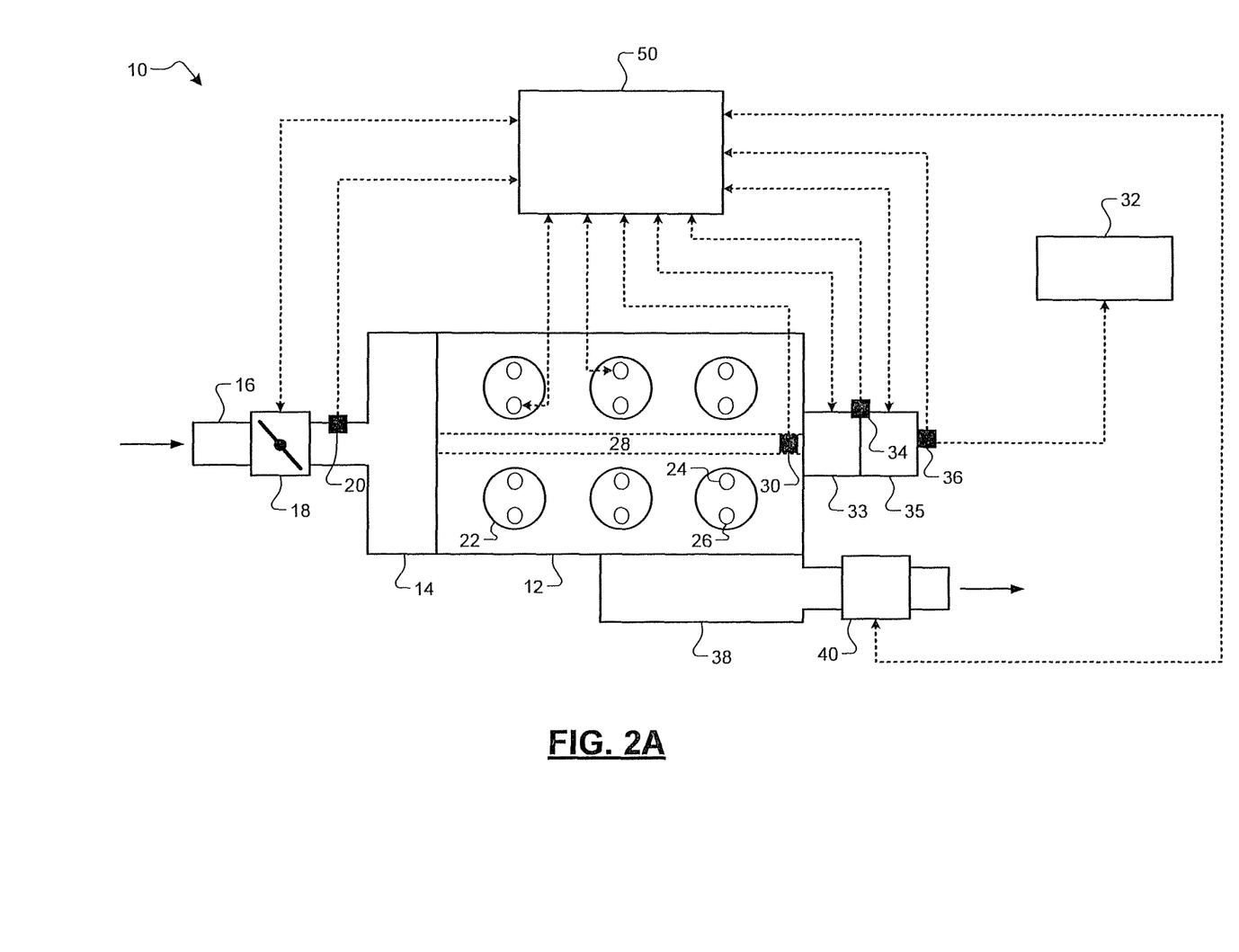
FIG. 2A is a functional block diagram of an exemplary engine system according to the present disclosure.

Referring now to FIG. 1, an engine system 10 includes an engine 12. For example, the engine system 10 may be used to propel a vehicle. The engine 12 may include a spark ignition (SI) engine, a compression ignition (CI) engine (e.g., a diesel engine), or a homogeneous charge compression ignition (HCCI) engine. The engine system 10, however, may also include a different type of engine and/or additional components (e.g., an electric motor, a battery system, a generator, etc.) such as in a hybrid electric vehicle or an electric vehicle.

The engine 12 draws air into an intake manifold 14 through an inlet system 16 that may be regulated by a throttle 18. For example, the throttle 18 may be electrically controlled (e.g., electronic throttle control, or ETC). A mass air flow (MAF) sensor 20 may measure a rate of airflow into the intake manifold 14. For example, the MAF may indicate a load on the engine. The air in the intake manifold 14 may be distributed to a plurality of cylinders 22. While six cylinders are shown, the engine 12 may include other numbers of cylinders.

The air may be combined with fuel from a plurality of fuel injectors 24 to create an air/fuel (NF) mixture. For example, the fuel injectors 24 may inject the fuel into intake ports of the cylinders 22, respectively ("port fuel injection"), or directly into the cylinders 22, respectively ("direct fuel injection"). Moreover, the fuel injectors 24 may inject the fuel at different times depending on the type of engine. Specifically, HCCI engines (using "spark assist") and SI engines compress the A/F mixture using pistons (not shown) and ignite the compressed A/F mixture using spark from spark plugs 26. CI engines (e.g., diesel engines), on the other hand, inject fuel into compressed air thereby causing combustion of the compressed A/F mixture.

The combustion of the A/F mixture drives the pistons (not shown) which rotatably turn a crankshaft 28 generating drive torque. An engine speed sensor 30 may measure a rotational speed of the crankshaft 28. For example, the engine speed sensor 30 may measure the rotational speed of the crankshaft 28 in revolutions per minute (RPM). The drive torque may be transferred to a driveline 32 of the vehicle 10 by a transmission 35. The transmission 35 may be coupled to the crankshaft 28 by a torque converter 33. For example, the torque converter 33 may be a fluid coupling. A turbine speed sensor 34 measures a rotational speed of a turbine of the torque converter 33. A TOSS sensor 36 measures a rotational speed of an output shaft of the transmission 35. For example, the TOSS sensor 36 may measure the rotational speed of the output shaft of the transmission 35 in RPM.

The transmission 35 may multiply the drive torque at the crankshaft 28 by one of a plurality of gear ratios. The transmission 35, therefore, may include a plurality of clutches that are selectively engaged or disengaged to establish a desired gear ratio. Thus, when shifting between gear ratios, clutch-to-clutch shifts occur. More specifically, at least one clutch is disengaged (the off-going clutch) while at least one clutch is concurrently engaged (the on-coming clutch). For example, control of the clutch-to-clutch shift may be based on engine torque.

Exhaust gas resulting from combustion may be expelled from the cylinders 22 into an exhaust manifold 38. An exhaust treatment system 40 may treat the exhaust gas in the exhaust manifold to decrease emissions before releasing the exhaust gas into the atmosphere. For example, the exhaust treatment system 40 may include one or more of catalytic converters, nitrogen oxide (NOx) absorbers/adsorbers, selective catalytic reduction (SCR) catalysts, and particulate matter (PM) filters. The engine system 10 may also include other systems including, but not limited to a turbocharger, a supercharger, and/or an exhaust gas recirculation (EGR) system.

A control module 50 communicates with and/or controls various components of the engine system 10. Specifically, the control module 50 may receive signals from the throttle 18, the MAF sensor 20, the fuel injectors 24, the spark plugs 26, the engine speed sensor 30, the torque converter 33, the turbine speed sensor 34, the transmission 35, the TOSS sensor 36, and/or the exhaust treatment system 40. The control module 50 may also control the throttle 18, the fuel injectors 24, the spark plugs 26, the torque converter 33, the transmission 35, and/or the exhaust treatment system 40. The control module 50 may also implement the system or method of the present disclosure.

Figure 2B:
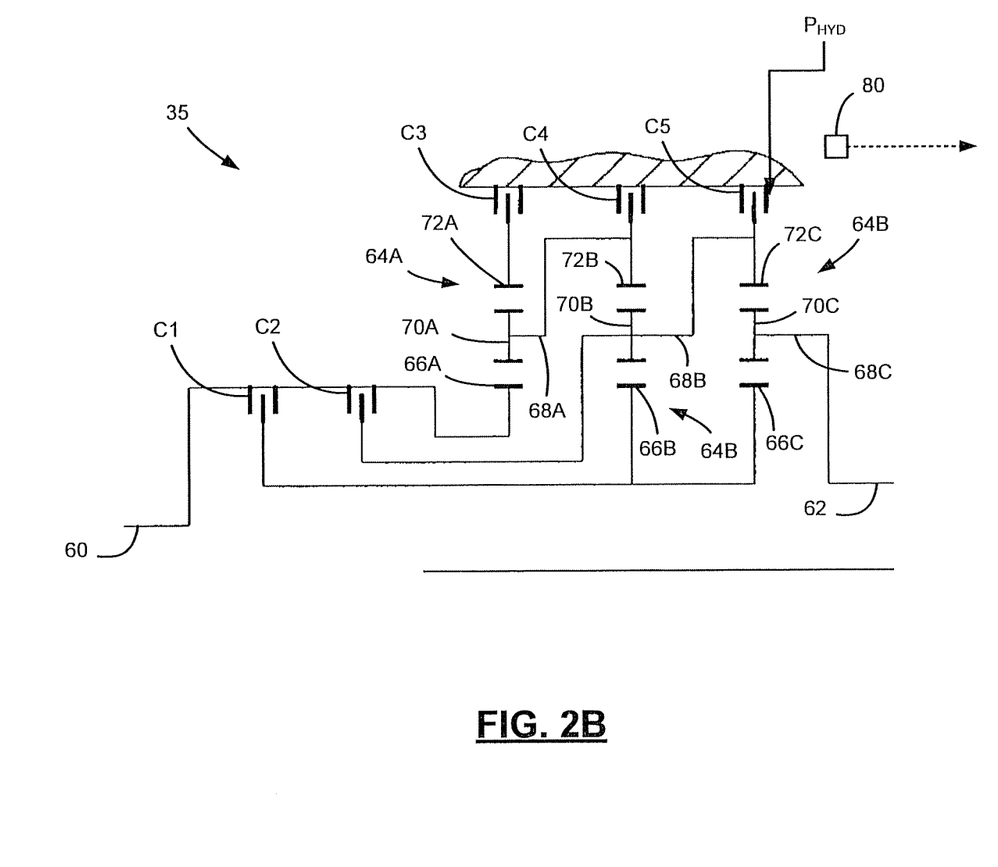
FIG. 2B is a schematic of an exemplary transmission according to the present disclosure.

Referring now to FIG. 2, the transmission 35 is shown in more detail. For example, the transmission 35 may include a six-speed automatic transmission as shown in FIG. 2. The transmission 35, however, may include a different type of transmission and/or other numbers of speeds (i.e., gear ratios). For example, the transmission 35 may include a dual clutch transmission (DCT).

The transmission 35 includes an input shaft 60, an output shaft 62 and three inter-connected planetary gear sets 64A, 64B and 64C, respectively. For example, the input shaft 60 may be connected to the turbine of the torque converter 33 and thus the turbine speed sensor 34 may measure a rotational speed of the input shaft 60. The planetary gear sets 64A, 64B, and 64C include respective sun gears 66A, 66B, and 66C, carriers 68A, 68B, and 68C, planetary gears 70A, 70B, and 70C and ring gears 72A, 72B, and 72C. The transmission 34 further includes clutches C1-C5 that are selectively engaged to establish a desired gear ratio of the transmission 35.

More specifically, the input shaft 60 continuously drives the sun gear 66A of the gear set 64A, selectively drives the sun gears 66B, 66C of the gear sets 64B, 64C via the clutch C and selectively drives the carrier 68B of the gear set 64B via the clutch C2. The ring gears 72A, 72B, and 72C of the gear sets 64A, 64B, and 64C are selectively grounded via the clutches C3, C4 and C5, respectively. Hydraulic pressure ($P_{HYD}$) is selectively provided to the various clutches to control engagement of the clutches. A pressure switch 80 is associated with the pressure line to each clutch and switches between ON and OFF states. More specifically, when $P_{HYD}$ is below a threshold pressure ($P_{THR}$), the switch is in the OFF state. When $P_{HYD}$ is greater than $P_{THR}$, the switch state is ON.

As depicted in Table 1 below, the state of the clutches C1-C5 (i.e., engaged or disengaged) may be controlled to provide six forward speed ratios (1, 2, 3, 4, 5, 6), a reverse speed ratio (R), or a neutral condition (N).

TABLE 1

|     | C1 | C2 | C3 | C4 | C5 |
|-----|----|----|----|----|----|
| $1^{st}$ | X |    |    |    | X  |
| $2^{nd}$ | X |    |    | X  |    |
| $3^{rd}$ | X |    | X  |    |    |
| $4^{th}$ | X | X  |    |    |    |
| $5^{th}$ |   | X  | X  |    |    |
| $6^{th}$ |   | X  |    | X  |    |
| R   |    |    | X  |    | X  |
| N   |    |    |    |    | X  |

For example, the second forward speed ratio (i.e., 2nd gear) is established when clutches C1 and C4 are engaged. Shifting from one speed forward speed ratio to another may generally be achieved by disengaging one clutch (the off-going clutch) while engaging another clutch (the on-coming clutch). For example, the transmission 35 may be downshifted from second gear to first gear by disengaging clutch C4 while engaging clutch C5.

Figure 3:
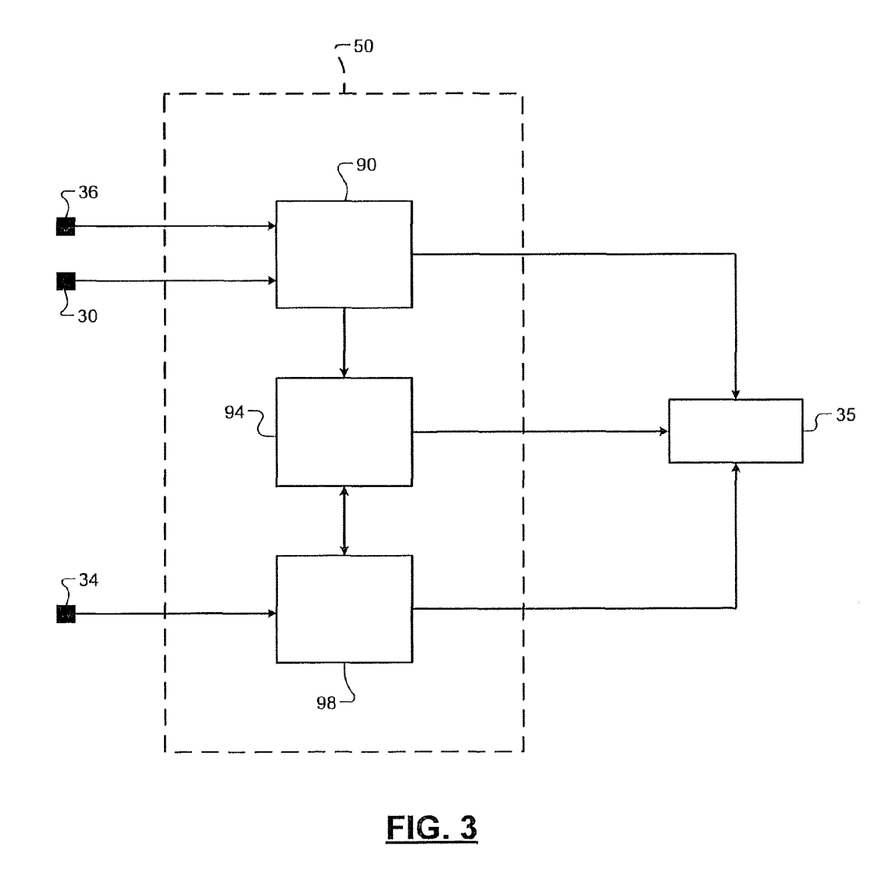
FIG. 3 is a functional block diagram of an exemplary control module according to the present disclosure.

Referring now to FIG. 3, the control module 50 is shown in more detail. The control module 50 may include a flare generation module 90, a flare control module 94, and a shift control module 98. The control module 50 may also include memory (not shown) for storing determined and/or predetermined parameters. For example, the memory (not shown) may include non-volatile memory (NVM).

The flare generation module 90 generates turbine speed flare. Specifically, the flare generation module 90 may generate the turbine speed flare when a power downshift operation is requested. For example, a power downshift operation may be requested based on engine speed, TOSS, and corresponding thresholds. More specifically, the flare generation module 90 may generate the turbine speed flare by decreasing pressure applied to an off-going clutch of the transmission 35. For example, the flare generation module 90 may decrease the pressure applied to the off-going clutch to greater than a predetermined pressure. Additionally or alternatively, for example, the flare generation module 90 may decrease the pressure applied to the off-going clutch until the turbine speed flare is greater than a predetermined speed difference (i.e., via feedback from the turbine speed sensor 34). The flare generation module 90 may then generate a signal for the flare control module 94. For example, the signal may notify the flare control module 94 that the required turbine speed flare has been generated.

The flare control module 94 may then control the turbine speed flare. Specifically, the flare control module 90 decreases the turbine speed flare by increasing pressure applied to the off-going clutch of the transmission 35. The flare control module 90 may increase the turbine speed flare until the turbine speed flare is less than a predetermined amount from a desired value (i.e., a desired turbine speed flare). The flare control module 94 may also communicate with the shift control module 98. For example, the flare control module 94 may decrease the turbine speed flare until notified by the shift control module 98 to stop.

Additionally or alternatively, the flare control module 94 may predict an overall turbine speed change during an inertia phase of the power downshift. For example, the overall turbine speed change may be determined based on the initial turbine speed (i.e., at the start of the power downshift) and the new gear ratio. The overall turbine speed change may then be divided into discrete changes in turbine speed. The flare control module 94 may determine a calibrated torque ratio of the off-going clutch of the transmission 35 for each of the discrete changes in turbine speed. For example, the flare control module 94 may include a lookup table that includes calibrated torque ratios for various input torques and discrete changes in turbine speed. For example only, a calibrated torque ratio of 0.5 may indicate that the off-going clutch of the transmission 25 is holding half of the input torque and the other half of the input torque is being used to overcome inertia.

The shift control module 98 controls power downshift operations of the transmission 35. Specifically, the shift control module 98 increases pressure applied to an on-coming clutch of the transmission 35 when the turbine speed flare is less than the predetermined amount from the desired turbine speed flare. The shift control module 98 may also communicate with the flare control module 94. For example, the shift control module 98 may send a stop signal to the flare control module 94 before increasing the pressure applied to the on-coming clutch of the transmission 35.

Figure 4A:
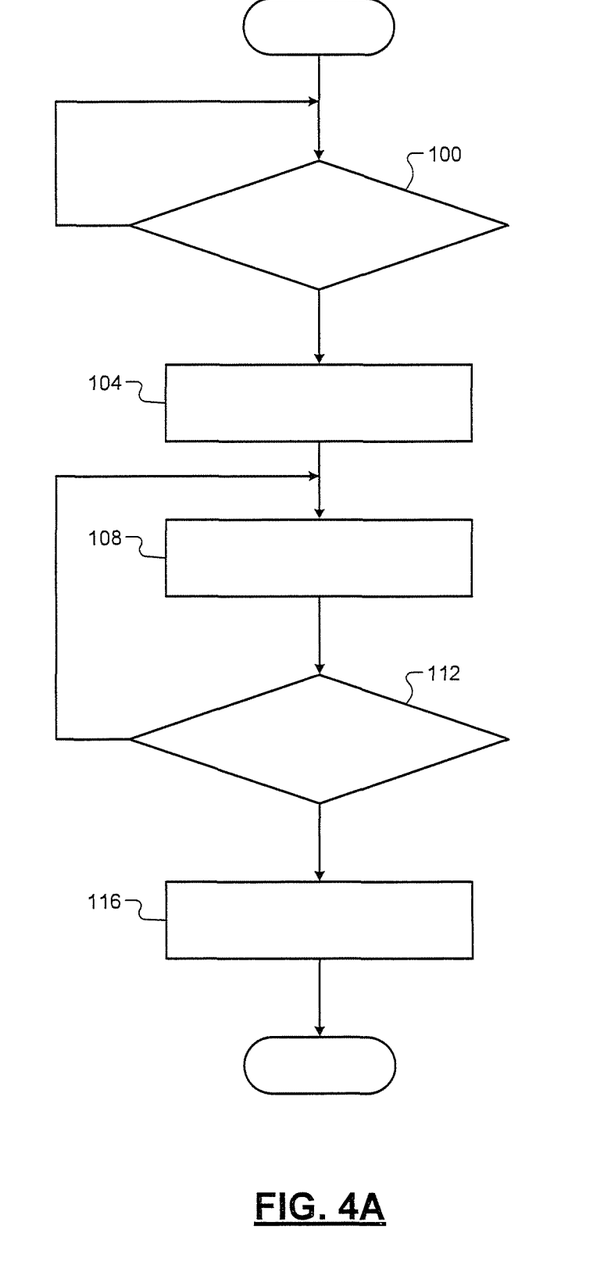
FIG. 4A is a flow diagram of an exemplary method for controlling power downshifts of a transmission according to the present disclosure.

Referring now to FIG. 4A, a method for controlling power downshifts of the transmission 35 begins at 100. At 100, the control module 50 may determine whether a power downshift operation is requested. If true, control may proceed to 104. If false, control may return to 100. At 104, the control module 50 may generate turbine speed flare by decreasing pressure applied to the off-going clutch of the transmission 35.

At 108, the control module 50 may decrease the turbine speed flare by increasing the pressure applied to the off-going clutch of the transmission 35. At 112, the control module 50 may determine whether the turbine speed flare ("TSF") is less than the predetermined amount from the desired TSF. If true, control may proceed to 116. If false, control may return to 108. At 116, the control module 50 may complete the power downshift operation by increasing pressure applied to the on-coming clutch of the transmission 35. Control may then end.

Figure 4B:
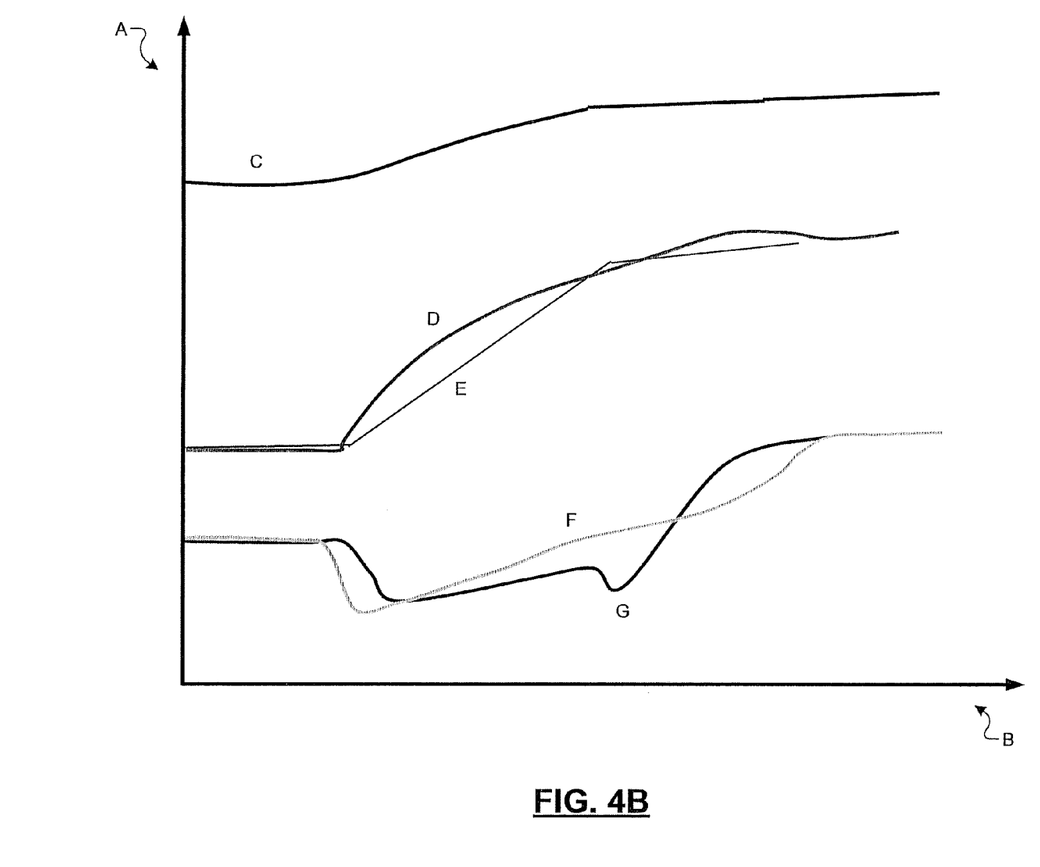
FIG. 4B is a graph illustrating engine torque, turbine speed, output acceleration, and on-coming clutch torque during a power downshift according to the present disclosure.

Referring now to FIG. 4B, engine torque, turbine speed, output acceleration, and on-coming clutch torque are shown during a power downshift operation controlled according to the present disclosure. For example, the on-coming clutch torque may refer to a pressure applied to the on-coming clutch (e.g., hydraulic fluid pressure). A vertical axis ("A") indicates torque or rotational speed (depending on each curve) and a horizontal axis ("B") indicates time. Additionally, curve "C" represents engine torque, curve "D" represents the turbine speed according to the method of the present disclosure, curve "E" represents turbine speed according to conventional control (see FIG. 1), curve "F" represents smoothed output acceleration according to the method of the present disclosure, and curve "G" represents output acceleration according to conventional control (see FIG. 1). As shown, engine torque is gradually increased (and does not decrease) during the power downshift which results in a smoothed output acceleration and thus decreased NVH.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system for controlling power downshifts of a transmission, comprising:
   a flare generation module that generates turbine speed flare by decreasing pressure applied to an off-going clutch of the transmission;
   a flare control module that decreases the turbine speed flare by increasing the pressure applied to the off-going clutch of the transmission; and
   a shift control module that increases a pressure applied to an on-coming clutch of the transmission when the turbine speed flare is less than a predetermined amount from a desired turbine speed flare.

2. The system of claim 1, wherein the flare generation module decreases the pressure applied to the off-going clutch of the transmission by a predetermined amount during each of periods.

3. The system of claim 1, wherein the flare generation module generates turbine speed flare greater than or equal to a predetermined turbine speed flare.

4. The system of claim 1, wherein the flare control module stops increasing the turbine speed flare when the turbine speed flare is less than the predetermined amount from the desired turbine speed flare.

5. The system of claim 1, wherein the turbine speed flare includes a difference between a measured turbine speed and a desired turbine speed.

6. The system of claim 5, wherein the shift control module monitors the measured turbine speed using a turbine speed sensor that measures a rotational speed of a turbine in a torque converter, wherein the torque converter is coupled to the transmission.

7. The system of claim 1, wherein the flare generation module generates the turbine speed flare when a power downshift of the transmission is requested.

8. The system of claim 7, wherein a power downshift of the transmission is requested based on at least one of engine speed, transmission output shaft speed (TOSS), and corresponding thresholds.

9. The system of claim 8, wherein the engine speed includes a rotational speed of a crankshaft of an engine and is measured using an engine speed sensor.

10. The system of claim 8, wherein the TOSS includes a rotational speed of an output shaft of the transmission and is measured using a TOSS sensor.

11. A method for controlling power downshifts of a transmission, comprising:
    generating turbine speed flare by decreasing pressure applied to an off-going clutch of the transmission;
    decreasing the turbine speed flare by increasing the pressure applied to the off-going clutch of the transmission; and
    increasing a pressure applied to an on-coming clutch of the transmission when the turbine speed flare is less than a predetermined amount from a desired turbine speed flare.

12. The method of claim 11, wherein generating the turbine speed flare includes decreasing the pressure applied to the off-going clutch of the transmission by a predetermined amount during each of a plurality of periods.

13. The method of claim 11, further comprising generating turbine speed flare greater than or equal to a predetermined turbine speed flare.

14. The method of claim 11, further comprising stopping the increasing of the turbine speed flare when the turbine speed flare is less than the predetermined amount from the desired turbine speed flare.

15. The method of claim 11, wherein the turbine speed flare includes a difference between a measured turbine speed and a desired turbine speed.

16. The method of claim 15, further comprising monitoring the measured turbine speed using a turbine speed sensor that measures a rotational speed of a turbine in a torque converter, wherein the torque converter is coupled to the transmission.

17. The method of claim 11, further comprising generating the turbine speed flare when a power downshift of the transmission is requested.

18. The method of claim 17, further comprising requesting a power downshift of the transmission based on at least one of engine speed, transmission output shaft speed (TOSS), and corresponding thresholds.

19. The method of claim 18, wherein the engine speed includes a rotational speed of a crankshaft of an engine and is measured using an engine speed sensor.

20. The method of claim 18, wherein the TOSS includes a rotational speed of an output shaft of the transmission and is measured using a TOSS sensor.

* * * * *